United States Patent
Elkhail et al.

(10) Patent No.: US 11,412,039 B2
(45) Date of Patent: Aug. 9, 2022

(54) SYSTEM AND METHOD FOR HIERARCHICAL CLUSTERING OF WIRELESS MOBILE NETWORK

(71) Applicant: King Fahd University of Petroleum and Minerals, Dhahran (SA)

(72) Inventors: Abdulrahman Abu Elkhail, Dhahran (SA); Uthman Baroudi, Dhahran (SA); Hesham Alfares, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/586,019

(22) Filed: Sep. 27, 2019

(65) Prior Publication Data
US 2020/0213389 A1 Jul. 2, 2020

Related U.S. Application Data

(60) Provisional application No. 62/785,064, filed on Dec. 26, 2018.

(51) Int. Cl.
*G06F 15/16* (2006.01)
*H04L 67/1087* (2022.01)
(Continued)

(52) U.S. Cl.
CPC ...... *H04L 67/1089* (2013.01); *H04L 67/1051* (2013.01); *H04L 67/1091* (2013.01); *H04W 4/80* (2018.02); *H04W 84/12* (2013.01)

(58) Field of Classification Search
CPC ............. H04L 67/1089; H04L 67/1051; H04L 67/1091; H04W 4/80; H04W 84/12; H04W 40/32; H04W 4/70
(Continued)

(56) References Cited

U.S. PATENT DOCUMENTS

| 6,876,643 B1* | 4/2005 | Aggarwal | H04W 8/005 370/254 |
| 2003/0041150 A1* | 2/2003 | Passman | H04W 84/20 709/227 |

(Continued)

OTHER PUBLICATIONS

Eshaftri, et al. ; Reliable Hierarchical Cluster-Based Routing Protocol for Wireless Sensor Networks ; Conference Paper ; Jun. 2014 ; 5 Pages.
(Continued)

*Primary Examiner* — Thuong Nguyen
(74) *Attorney, Agent, or Firm* — Oblon, McClelland, Maier & Neustadt, L.L.P.

(57) ABSTRACT

A method, network system, and non-transitory computer readable medium that arrange a set of wireless mobile devices into a two-level clustering structure including a cluster in a first-level and a cluster in the second-level, based on node status registered and algorithm preinstalled in a back-end server, where each of the set of wireless mobile devices is assigned either one of a slave member of a cluster in the first-level, a master of a cluster in the first-level where the master is also a member of a cluster in the second-level, or a super master of a cluster in the second-level where a master of a cluster in the first-level is assigned as the super master. The two-level clustering structure is periodically updated. Only the super-masters are configured to communicate with the back-end server via a long-range connection to WLAN, while a short-range wireless interface is used for internal communications.

1 Claim, 11 Drawing Sheets

(51) Int. Cl.
  *H04L 67/104* (2022.01)
  *H04W 4/80* (2018.01)
  *H04W 84/12* (2009.01)

(58) Field of Classification Search
  USPC ........ 709/227, 208, 204; 370/338, 254, 913, 370/449, 457; 455/7; 375/132
  See application file for complete search history.

(56) References Cited

U.S. PATENT DOCUMENTS

| | | | | |
|---|---|---|---|---|
| 2009/0075587 | A1* | 3/2009 | Yu | H04W 72/1231 455/7 |
| 2009/0092112 | A1* | 4/2009 | Kim | H04W 52/0216 370/338 |
| 2009/0327174 | A1* | 12/2009 | Honkala | G06N 20/00 706/12 |
| 2013/0132500 | A1* | 5/2013 | Vandwalle | H04L 67/104 709/208 |
| 2015/0006633 | A1 | 1/2015 | Vandwalle et al. | |
| 2015/0358810 | A1* | 12/2015 | Chao | H04W 4/50 455/418 |
| 2016/0050114 | A1* | 2/2016 | John Archibald | H04W 52/0261 370/254 |
| 2016/0282156 | A1* | 9/2016 | Ott | G01D 18/00 |
| 2016/0345165 | A1* | 11/2016 | Hoefel | H04W 8/24 |
| 2020/0213389 | A1* | 7/2020 | Elkhail | H04L 67/1051 |

OTHER PUBLICATIONS

Liu ; Clustering Routing Algorithms in Wireless Sensor Networks: An Overview ; KSII Transactions on Internet and Information Systems vol. 6, No. 7 ; Jul. 2012 ; 22 Pages.

* cited by examiner

SYSTEM AND METHOD FOR HIERARCHICAL CLUSTERING OF WIRELESS MOBILE NETWORK

CROSS-REFERENCE TO RELATED APPLICATIONS

The present application claims benefit of priority from U.S. Provisional Patent Application No. 62/785,064 having a filing date of Dec. 26, 2018 and which is incorporated by reference in its entirety.

STATEMENT OF ACKNOWLEDGEMENT

The support of the Deanship of Scientific Research (DSR) at King Fahd University of Petroleum and Minerals (KFUPM) under grant no. RG1424-4 is gratefully acknowledged.

BACKGROUND

Technical Field

The present disclosure is directed to hierarchical clustering of wireless mobile devices for tracking or content distribution networks.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Modern smartphone devices are capable of activating tracking systems by exploiting GPS, embedded sensors, and wireless local area network (WLAN) technologies for positioning, data collection, and communication. However, for large-scale tracking wireless sensor networks (WSN) that track the random movement of people, the continuous usage of GPS and direct connection to WAN under IEEE 802.11 standards ("Wi-Fi") of each person's smartphone is not an energy-efficient solution.

In order to save energy and prolong the lifetime of the network, nearby mobile smartphones are traditionally grouped to form Bluetooth small groups (clusters) classified into a single level of Bluetooth clustering, as described in Pathak S. and Jain S., "A novel weight based clustering algorithm for routing in MANET," *Wireless Networks*, 22(8), 2695-2704, 2016, and in Osman M. M. A., Syed-Yusof S. K., Malik N. N. N. A., and Zubair S., "A survey of clustering algorithms for cognitive radio ad hoc networks," *Wireless Networks*, 24(5), 1451-1475, 2018—both incorporated herein by reference. In Bluetooth specifications, a cluster, also called a piconet, is a small network that consists of one master (cluster head) and up to seven cluster ("slave") members. Bluetooth Specifications. Bluetooth Technology Website at https://www.bluetooth.com Retrieved August 2017—incorporated here by reference. Cluster members communicate locally with their cluster head via low-energy Bluetooth, while only the cluster head uses energy-consuming Wi-Fi for long-range communications with the server.

Clustering approaches have been frequently used in Wireless Sensor Networks (WSN). Various clustering approaches for WSN were compared based on several metrics such as convergence rate, stability, overlapping, energy efficiency, failure recovery, balanced clustering, and node mobility as described in Abbasi A. A. and Younis M, "A survey on clustering algorithms for wireless sensor networks," *Computer communications*, 30(14-15), 2826-2841, 2007. However, Bluetooth technology was not considered in classifying the clustering schemes.

An algorithm for minimizing the total energy consumed in the system by organizing sensors into a hierarchy of clusters that communicate together to transmit data to a data processing center was proposed as described in Bandyopadhyay S. and Coyle E. J., "An energy efficient hierarchical clustering algorithm for wireless sensor networks," *Twenty-Second Annual Joint Conference of the IEEE Computer and Communications Societies*, Vol. 3, pp. 1713-1723, 2003, IEEE. The proposed approach assumed that the communication environment was contention-free and error-free.

A distributed clustering approach, called the Cooperative Networking protocol (CONET) was proposed for improving the energy efficiency of wireless networks, as described in Yoo J. W. and Park K. H., "A cooperative clustering protocol for energy saving of mobile devices with WLAN and Bluetooth interfaces," *IEEE Transactions on Mobile Computing*, 10(4), 491-504, 2011. The CONET dynamically clusters the nodes in the network according to the bandwidth, energy, and application type of each node. The CONET is based on one-level clustering, assuming no mobility and no mutual interference.

An energy-saving collaborative method for solving multi-target tracking problems in WSN was proposed as described in Teng J., Snoussi H. and Richard C., "Collaborative multi-target tracking in wireless sensor networks," *International Journal of Systems Science*, 42(9), 1427-1443, 2011. Distributed cluster-based variational target tracking is used when the targets are far apart, and data association is used when the targets are close to each other. The method is designed to track a varying number of targets, by allowing the arrival of new targets and the departure of some existing targets.

A mobile clustering procedure with three cost metrics: the residual battery energy, the physical data rate, and the number of members in the estimated cooperation group was proposed as described in Leem H., Jung B. H., and Sung D. K., "Cooperative MS-grouping schemes based on three cost metrics for improving battery lifetime and energy efficiency," *IEEE 22nd International Symposium on Personal Indoor and Mobile Radio Communications*, pp. 899-903, 2011. The device which has the highest cost metric value is chosen as a group header (GH) and the other devices act as group members (GMs). The GH receives the data from GMs via its Bluetooth interface and transmits the data to a WLAN access point (AP) by using its WLAN interface. This approach is not suitable for saving energy for a large-scale system, since it can lead to high interference when the number of nodes in the WLAN AP coverage is large.

A comprehensive overview of energy-efficient peer-to-peer collaboration in mobile devices based on mobile clustering through wireless networks was presented in Al-Kanj L., Dawy Z., and Yaacoub E., "Energy-Aware Cooperative Content Distribution over Wireless Networks: Design Alternatives and Implementation Aspects," *IEEE Communications Surveys and Tutorials*, 15(4), 1736-1760, 2013. An analytical study reported the impact of factors such as the number (cluster size) of a set of mobile terminals that are interested in downloading the same content cooperatively.

An analytical study was reported on the impact of network parameters, such as the values of the sending and receiving energies per unit time and the cluster size of a set of cooperating mobile terminals, on long-range and short-range energy consumption as described in Al-Kanj L. and Dawy Z., "Impact of network parameters on the design of energy-aware cooperative content distribution protocols," *Transactions on Emerging Telecommunications Technologies*, 24(3), 317-330, 2013. A grid network, a frequently used model in ad-hoc and sensor networks was discussed.

A fuzzy clustering approach to reduce energy consumption in WSN by balancing the load among the cluster heads was reported in Baranidharan B. and Santhi B., "DUCF: Distributed load balancing Unequal Clustering in wireless sensor networks using Fuzzy approach," *Applied Soft Computing*, 40, 495-506, 2016. Distributed Unequal Clustering using Fuzzy logic (DUCF) was used to select cluster heads and assign them to clusters of different sizes. Based on the residual energy, node degree, and distance to base station, DUCF selects the cluster heads and determines the number of members in each cluster.

Adaptive Distributed Hierarchical Sensing (ADHS) algorithm was proposed as described in Oren G., Barenboim L., and Levin H., "Adaptive Distributed Hierarchical Sensing algorithm for reduction of wireless sensor network cluster-heads energy consumption," *IEEE the 13th International Wireless Communications and Mobile Computing Conference*, pp. 980-986, 2017. ADHS uses a proximity-traversing-based algorithm, called Hierarchical Control Clustering (HCC), to optimize energy consumption. HCC consists of two main sub-processes, the first is the Tree Discovery process and the second is the Cluster Formation process.

In order to balance network lifetime and coverage in WSN, pursuing three optimization objectives: minimum energy consumption, maximum coverage rate, and maximum equity of energy consumption was reported in Xu Y., Ding O., Qu R., and Li K., "Hybrid multi-objective evolutionary algorithms based on decomposition for wireless sensor network coverage optimization," *Applied Soft Computing*, 68, 268-282, 2018. Two multi-objective evolutionary algorithms (MOEAs) were developed to solve the optimization model, one based on decomposition and the other based on genetic algorithms.

In addition to clustering, a variety of other techniques have also been used for optimization applications in WSN. A bandwidth aggregation (BAG) technique to design energy-efficient heterogeneous Wi-Fi access networks was proposed as described in Oh H., Lee J., and Choi J. K., "Energy-efficient dynamic load distribution for heterogeneous access networks," *IEEE International Conference on ICT Convergence*, pp. 18-23, 2013. The proposed algorithm can reduce power consumption in mobile devices with Wi-Fi access networks, but it does not use Bluetooth.

A new localization technique for WSN by integrating the received signal strength indicator (RSSI) method with the social network analysis (SNA) method was developed as described in Farrag M., Abo-Zahhad M., Doss M. M., and Fayez J. V., "A new localization technique for wireless sensor networks using social network analysis," *Arabian Journal for Science and Engineering*, 42(7), 2817-2827, 2017. Since the RSSI method is limited to pairs of nodes within communication range, it is supplemented by SNA to improve localization accuracy.

As described above, previously attempts have not sufficiently taken into account the realistic aspects of large-scale systems, for example where multiple Bluetooth clusters with mobility and signal interference co-exist. In the present disclosure, a new approach for energy efficient solutions will be presented for the large-scale systems in such environments where communication is affected by interference and errors.

SUMMARY

In an exemplary embodiment, a method includes registering a node status for each of a set of wireless mobile devices to a back-end server, arranging the set of wireless mobile devices into a two-level clustering structure, where each of the set of wireless mobile devices is assigned either one of three positions in clustering: 1) a slave member of a cluster in the first-level, 2) a master of a cluster in the first-level where the master is also a slave member of a cluster in the second-level, or 3) a super master of a cluster in the second-level where a master of a cluster in the first-level is assigned as the super master, and updating periodically the two-level clustering structure based on a node status registered most recently, where, the super-masters are configured to communicate with the back-end server via a long-range connection to wireless local area network (WLAN), and internal communications are configured to be performed using a short-range wireless interface, and a total amount by number of cluster members belonging to a cluster not including a cluster head is configured to be smaller than a maximum cluster size including a cluster head, the maximum cluster size given by a specification of the short-range wireless interface.

In another exemplary embodiment, a method includes registering the node status and obtaining a set of solutions minimizing an objective function Z, assigning each of the set of wireless mobile devices either one of the three positions in clustering based on the set of solutions, and updating the two-level clustering structure periodically based on the node status registered most recently.

In another exemplary embodiment, a network system includes a set of wireless mobile devices and a back-end server, the backend server further comprising a memory, a processor and a controller, where the network system is configured to register a node status, and to arrange the set of wireless mobile devices into the two-level clustering structure, and to update the two-level clustering structure periodically based on the node status registered most recently.

In another exemplary embodiment, a non-transitory computer readable medium having instructions stored that, when executed by one or more processor, cause the one or more processors to perform a method, the method includes: registering a node status including a series number, a location, a battery residual power level ("battery level") and an availability of Wi-fi for each of a set of wireless mobile devices, where the set of wireless mobile devices is configured to communicate with a back-end server, and the back-end server including a memory, a processor and a controller is configured to store and to process received information on the node status based on installed algorithm; arranging the set of wireless mobile devices into the two-level clustering structure, the two-level clustering structure comprising a cluster in a first-level and a cluster in a second-level; and updating the two-level clustering structure periodically based on the node status registered most recently.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
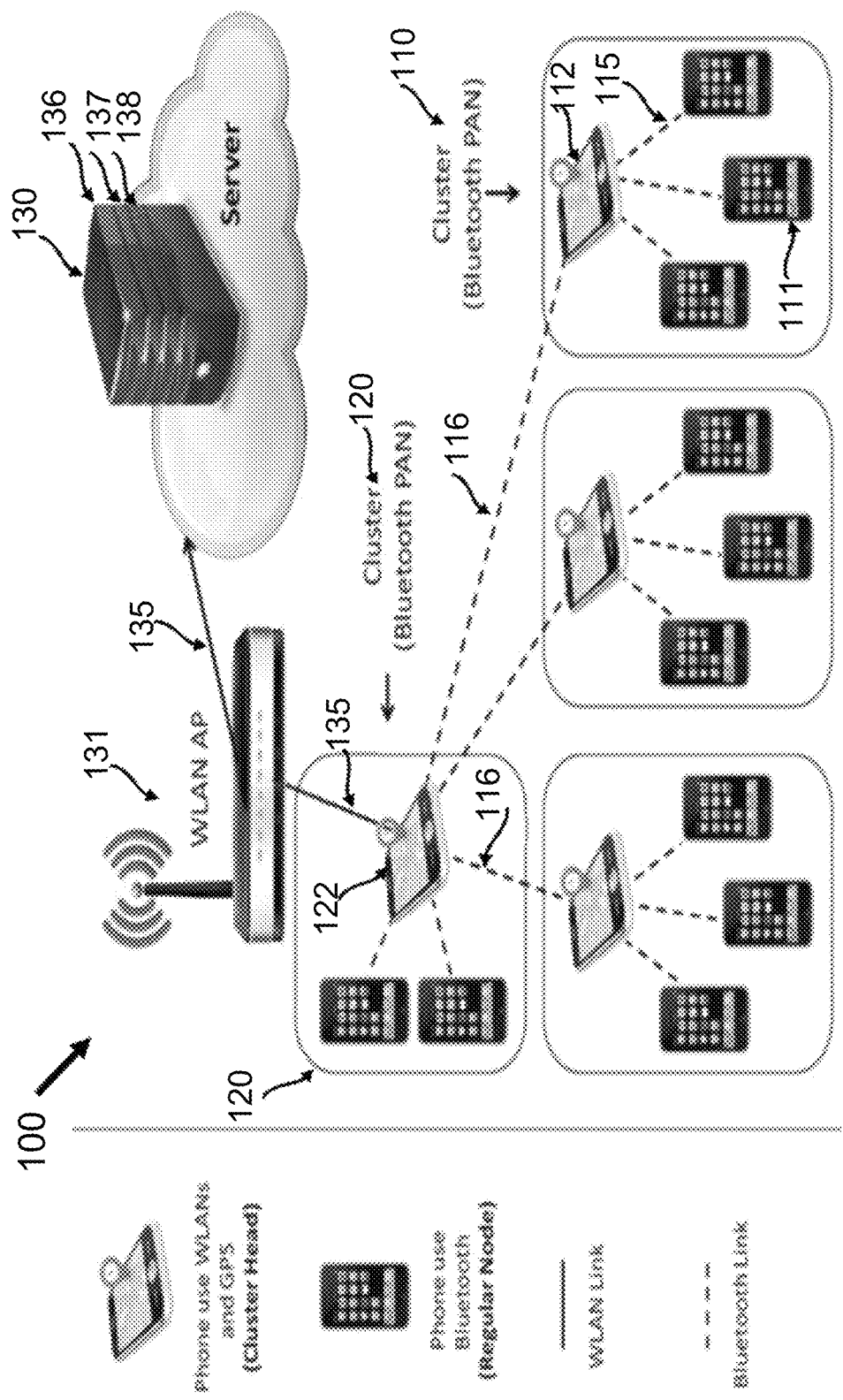
FIG. 1 is an exemplary illustration of concept of two-level hierarchical clustering algorithm, according to certain embodiments of the present disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

As described in "background," many solutions have been proposed for reducing energy for large-scale tracking systems using either Bluetooth or Wi-Fi as the short-range wireless interfaces. However, none of those proposed solutions are fully suitable for large-scale tracking applications in open areas with huge crowds, high mobility and signal interference.

Aspects of the present disclosure are directed to a new method, system and computer program product for large-scale systems in environments in open areas with huge crowds and high mobility where communication is affected by interference and errors. Energy-efficient solutions for large-scale tracking wireless sensor networks (WSN) under such environments are described. The new approach is based on bi-level hierarchical clustering, and has several realistic features that are addressed simultaneously. Mobile clusters classified in two levels, the first-level cluster with a super master and the second-level cluster with a master are described, in which Wi-Fi communication is limited to the super masters that constitute a subset of the total number of nodes (mobile wireless devices). In addition, the method, system and computer program product consider both Bluetooth and Wi-Fi signals, and specify a number of clusters and a formation of the clusters including assignment of a master and members for each cluster in the first-level and of a super master and members for each cluster in the second-level, for maximizing the performance and minimizing the energy consumption. Moreover, the method, system and computer program product consider the interference between Bluetooth and Wi-Fi signals as well as between different Bluetooth signals for multiple nodes co-existing in the same area.

FIG. 1 is an exemplary illustration of a two-level hierarchical clustering algorithm, according to certain embodiments of the present disclosure. It has a large set of wireless mobile devices 100, e.g., "nodes" (individuals, each with their own cell phone). This set of nodes will be divided into small clusters (groups) of nearby smartphones arranged in two hierarchical levels, e.g., clusters in the first-level 110 and clusters in the second-level 120. Each cluster resides within a small area, so communication 115 within each cluster, between the master 112 and cluster members 111 and communication 116 between masters 112 and super-masters 122 are done via a short-range wireless interface with low-energy consumption, such as Bluetooth. To save energy, only second-level masters (super masters) 122 are configured to use a long-range communication 135 such as Wi-Fi via WLAN with the back-end server 130 to share a node status of each members, where the node status includes a type of position in clustering (super master, master or cluster member), location, battery level and Wi-Fi availability via WLAN access point (AP) 120. The back-end server 130 includes a memory 136 and a processor 137 for storing the node status received, processing received data set based on installed algorithm and sending processed data to the super masters 122. The processor 137 may include circuitry with instructions to solve a minimization problem.

In the present disclosure, the analysis is based on using Bluetooth version 4.2, also known as Bluetooth Low Energy (BLE) or Bluetooth Smart. This version has several useful features such as higher speed, greater capacity, and enhanced security, as described in Bluetooth Specifications, at Bluetooth Technology Website, https://www.bluetooth.com, Retrieved August 2017, the entire content of which is herein incorporated by reference. The version 4.2 allows only trusted owners to track device locations and confidently pair devices. It also facilitates Internet of Things (IoT) applications due to its low power consumption and efficiency in transmitting data over the Internet.

Here, a mathematical programming model is presented for maximizing the performance and minimizing energy consumption of large-scale tracking systems based on the two-level hierarchical clustering structure. In order to achieve the goals of efficient energy consumption and good quality of service, the following objectives are preferably attained simultaneously:

I. Minimizing the number of clusters (masters) for the first-level of the clustering hierarchy;

II. Minimizing the total distance between masters and cluster members for the first-level of the clustering hierarchy;

III. Minimizing the number of clusters (super masters) for the second-level of the clustering hierarchy; and IV. Minimizing the total distance between super masters and masters for the second-level of the clustering hierarchy.

The first objective, minimizing the number of the clusters, leads to reducing the energy consumption, which in turn leads to maximizing the network lifetime. Moreover, minimizing the number of clusters reduces channel access congestion, which reduces the interference among Bluetooth-based clusters as well as Bluetooth/Wi-Fi communications when they are employed in the same area. The second objective, which is minimizing the total distance between first-level masters and cluster members, leads to higher accuracy of positioning. The master node represents the location information of all its cluster members. Therefore, communicating via short-range wireless interfaces such as Bluetooth is more accurate for reporting locations than communicating via long-range radio interfaces. The expected error in positioning is ±10 m, which is the maximum range of the Bluetooth signals. Furthermore, shorter distances reduce the energy consumption and the transmission delay of Bluetooth networks, since communicating via short-range wireless interfaces such as Bluetooth consumes lower power than communicating via long-range radio interfaces. The third objective is similar to the first objective, and it has similar benefits, but it applies to the second level of the network clustering hierarchy. Likewise, the fourth objective is similar to the second objective and has similar advantages, but it applies to the second level of the hierarchy.

Equations (1)-(6) defines symbols for expressing the above objectives by a set of equations discussed later. Here, the subscripts i=1 to N denote the cluster member number, the subscripts j=1 to N denote the master number, and $C_{ij}$, the distance between node i and node j. Let $WF_j$ denote the availability of Wi-Fi service in node (user's smartphone) j as defined in (1). The user's battery level ($BL_j$) is defined as in (2). Equations (3)-(6) define the decision variables corresponding to a status of the node in the clustering hierarchy, where equations (3) and (4) describe the decision variables for the first-level, while equations (5) and (6) describe the decision variables for the second level.

$$WF_j = \begin{cases} 1, & \text{if device } j \text{ has the long-range connection to } WLAN \\ 0, & \text{otherwise} \end{cases} \quad (1)$$

$$BL_j = \begin{cases} 1, & \text{if battery level of device } j \text{ is} \geq 50\% \\ 0, & \text{otherwise} \end{cases} \quad (2)$$

$$X_{ij} = \begin{cases} 1, & \text{if device } i \text{ is a cluster member belongs to master } j \\ 0, & \text{otherwise} \end{cases} \quad (3)$$

$$Y_j = \begin{cases} 1, & \text{if device } j \text{ is assigned as a master} \\ 0, & \text{otherwise} \end{cases} \quad (4)$$

$$V_{ij} = \begin{cases} 1, & \text{if master } i \text{ is a cluster member belongs to super master } j \\ 0, & \text{otherwise} \end{cases} \quad (5)$$

$$W_j = \begin{cases} 1, & \text{if master } j \text{ is assigned as a super master} \\ 0, & \text{otherwise} \end{cases} \quad (6)$$

A complete mathematical representation for attaining the objectives specified above is given by the set of equations (7)-(16), based on the definitions (1)-(6). The equation (7) gives an objective function Z to be minimized, where the four terms represent the objectives I to IV. The first two terms aim to minimize the number of clusters (masters) and the total distance between masters and cluster members for the first level of the network hierarchy. The third and fourth terms aim to minimize the number of clusters (super masters) in the second-level and the total distance between super masters and the number of clusters (masters) in the second level of the hierarchy.

The objective function (7) is to be optimized subject to nine constraints. The first constraint (8) ensures that every cluster member has a master. Constraints (9) and (10) limit first-level cluster size to 8 (1 master plus 7 cluster members) and ensure that first-level cluster members are within covering distance range of the Bluetooth, which is currently about 10 m, respectively. Constraint (11) ensures that every master has a super master. Constraints (12) and (13) limit second-level cluster size to 8 (1 super master and 7 cluster members) in the second level namely, the first-level masters) and ensure that cluster members in the second-level are within the Bluetooth range, respectively. Constraints (14) ensure that each super master must be already a master. The last two constraints, (15) and (16), ensure that the super master has Wi-Fi connection and a battery level greater than or equal to 50%, respectively. The fixed cost of each master and super master is denoted by F, and it is set equal to 100.

$$Z = \sum_{i=1}^{N} \sum_{j=1}^{N} C_{ij} X_{ij} + \sum_{j=1}^{N} F_j Y_j + \sum_{i=1}^{N} \sum_{j=1}^{N} C_{ij} V_{ij} + \sum_{j=1}^{N} F_j W_j \quad (7)$$

Subject to $$\sum_{j=1}^{N} X_{ij} = 1, \ i=1 \ldots N \quad (8)$$

$$\sum_{i=1}^{N} X_{ij} \leq 8 Y_j, \ j=1 \ldots N \quad (9)$$

$$\sum_{j=1}^{N} C_{ij} X_{ij} \leq 10, \ i=1 \ldots N \quad (10)$$

$$\sum_{j=1}^{N} V_{ij} \leq Y_i, \ i=1 \ldots N \quad (11)$$

$$\sum_{i=1}^{N} V_{ij} \leq 8 W_j, \ j=1 \ldots N \quad (12)$$

$$\sum_{j=1}^{N} C_{ij} V_{ij} \leq 10 Y_j, \ i=1 \ldots N \quad (13)$$

$$W_j \leq Y_j, \ j=1 \ldots N, \quad (14)$$

$$W_j \leq WF_j, \ j=1 \ldots N, \quad (15)$$

$$W_j \leq BL_j, \ j=1 \ldots N, \quad (16)$$

It is also noted that the Wi-Fi connection may be substituted by other types of long-range connection to WLAN, and the Bluetooth also may be substituted by different types of short-range wireless interface for internal communications between the wireless mobile devices, as a close modification of and within the scope of the present disclosure.

Heuristic Clustering

In very large-scale mobile tracking applications, the solution of the mathematical representation presented above can be difficult or time-consuming. Therefore, a fast and effective heuristic approach based on hierarchical mobile clustering is described to minimize energy consumption and to reduce interference in very large-scale Bluetooth networks, based on bi-level hierarchical mobile clustering. The described bi-level clustering algorithm focuses on node battery level and Wi-Fi connection availability. In order to achieve the best performance, the following requirements are preferably satisfied:

Each node makes its own decisions based on its local information.

Each node can be either a cluster member that belongs to exactly one cluster (cluster member for a first-level master), a first-level master (also a cluster member for a super master), or a second-level master (super master).

Clusters must include all nodes, without any overlap (common nodes) between different clusters.

Message exchange should be efficient in order to meet clustering processing requirements.

The heuristic Hierarchical Clustering Algorithm iteratively constructs a bi-level clustering structure for all nodes in the network. When all nodes are booted up, each node will broadcast its credentials (such as its battery level, Wi-Fi connection availability, etc.) to all nodes within its range. As the first step in the construction of first-level clusters, all nodes that have Wi-Fi connection availability are eligible to be masters or cluster members for the first level clusters, while the nodes that do not have Wi-Fi are only eligible to be cluster members.

Next, as the second step, among the nodes with Wi-Fi connection, the node that has the highest battery level will be chosen as a master of a particular first-level cluster, and the closest (preferably up to seven, but other numbers are possible depending on the technology) nodes can join as cluster members for the particular cluster. The construction process continues until each node is assigned as either a master or a cluster member that belongs to exactly one cluster at the end of the first-level clustering procedure. After that, as the third step, the construction of second-level clusters begins. The first-level master which has Wi-Fi connection and the highest battery level will be chosen as a super master for a second-level cluster, and the closest (preferably up to seven but the number may vary depending on the technology) masters for the first-level can join as second-level cluster members (cluster members for the super master). Reassignments of some of nodes may occur, where a node initially assigned as a master in the first-level may be chosen as the super master. The construction process continues until each node is assigned either as a cluster member for a first level cluster, a master for the first-level cluster, also a cluster member of a second level cluster, or a super master for a second level cluster. Cluster members and masters use low-energy Bluetooth technology, while only super masters use Wi-Fi connection for communication with the server.

As an alternative approach to the first and the second steps in the above algorithm, the node that has the highest battery level among the nodes with Wi-Fi connection will be chosen as a master of a particular cluster for the first-level, and the closest (up to seven) nodes can join as cluster members for the particular cluster. Those steps are continued until about five percent or more, more preferably about seven percent or more of the total nodes have been selected as the masters. Then, remaining masters may be chosen without the requirement of Wi-Fi connection availability but with the requirement of the highest battery level among the nodes for which eligibility to the master yet to be examined.

First-level cluster size p includes the first-level master, while second-level cluster size m does not include the second-level (super) master. In one example about fifty percent ($\frac{1}{2}$) to fourteen percent ($\frac{1}{7}$) of the total nodes are needed to be chosen as the masters, assuming p nodes (p=2 to 7) will be grouped into each of the clusters in the first-level in average. However other numbers and percentages may be used depending on the technology. Further assuming m masters (m=6 to 1) are assigned in average as the cluster members of each of the clusters in the second level, then about five percent ($\frac{1}{4} \times 1/(4+1)$), the minimum occurs when p is 4 or 5 to about seven percent ($\frac{1}{7} \times 1/(1+1)$) of the total nodes will be required to be chosen as the super masters which requires, for example, a Wi-Fi connection (other criteria such as: time in serving as cluster; % of consumed energy while serving as a master node; node movement direction, for instance, if the master node is moving opposite to the potential member, in such case, the two nodes will lose connectivity very soon, may be used together with or alternately to the availability of a Wi-Fi connection). However, as discussed later, around two percent of the total nodes are selected as the super masters in a minimized solution. Therefore, including the masters with the availability of Wi-Fi connection up to about five percent, more preferably up to about seven percent of the total nodes, should suffice as an alternative condition to select masters, instead of requiring that all of the masters have the availability of a Wi-Fi connection. Details are summarized in Table 1. Here, a relation $l=n \times (m+1)$ has been used in estimation, where l and n denotes a total number of masters initially selected in the first-level and a total number of super masters, respectively in average, and m denotes the number of cluster members (slaves of a super master) of each of the clusters in the second level, in average.

TABLE 1

Estimated numbers of masters l and super masters n when a number of members p in a cluster in the first-level and a number of masters m assigned as slave members in a cluster in the second-level are assumed in average. N denotes a total numbers of nodes.

| Size of first-level cluster p = number of members including the master | Number of masters $\frac{l}{N}$ (%) | Number of masters m assigned as slave members in a cluster in the second-level | Number of super masters $\frac{n}{N}$ (%) |
|---|---|---|---|
| 1 | 100 | N.A. | N.A. |
| 2 | 50 | 6 | 7.1 |
| 3 | 33.3 | 5 | 5.6 |
| 4 | 25 | 4 | 5.0 |
| 5 | 20 | 3 | 5.0 |
| 6 | 16.7 | 2 | 5.6 |
| 7 | 14.3 | 1 | 7.2 |
| 8 | 12.5 | N.A. | N.A. |

Table 2 presents pseudo codes of the Hierarchical Clustering Algorithm, which constructs a two-level hierarchical clustering structure for mobile networks according to above described algorithm.

TABLE 2

| Pseudo code of the algorithm |
|---|
| 1:   If N > 0 (N: Number of nodes) |
| 2:   for i =1: N // first-level clustering |
| 3:     if (i has Wi-Fi) |
| 4:       Update possible Master |
| 5:     else |

TABLE 2-continued

Pseudo code of the algorithm

| | |
|---|---|
| 6: | Update possible Cluster member |
| 7: | end if |
| 8: | if (i has highest battery level BL) |
| 9: | Update become Master |
| 10: | end if |
| 11: | for j = 1: possible Cluster member |
| 12: | if ($C_{ij} \leq 10$)// Bluetooth range |
| 13: | Update M-possible Cluster members |
| 14: | end if |
| 15: | if (M $\leq$ 7) |
| 16: | Update all M become Cluster members |
| 17: | Cluster size = M |
| 18: | else |
| 19: | Update closest 7 become Cluster members |
| 20: | Cluster size = 7 |
| 21: | end if |
| 22: | Update N = N − Cluster size |
| 23: | ----Start second-level clustering---- |
| 24: | for i = 1: K (K: Number of first-level Masters) |
| 25: | if (i has highest battery level BL) |
| 26: | Update become super master |
| 27: | else |
| 28: | Update possible second-level member |
| 29: | end if |
| 30: | for j = 1: possible second-level member |
| 31: | if ($C_{ij} \leq 10$)// Bluetooth range |
| 32: | Update M-possible second-level member |
| 33: | end if |
| 34: | if (M $\leq$ 7) |
| 35: | Update all M become second-level members |
| 36: | Cluster size = M |
| 37: | else |
| 38: | Update closest 7 become second-level members |
| 39: | Cluster size = 7 |
| 40: | end if |
| 41: | Update K = K − Cluster size |
| 42: | end if |

After clusters are formed and masters and super masters are selected, the process of data exchange starts. This process takes place between cluster members and first-level masters, between first-level masters and super masters, and between super masters and the back-end server. The super masters use Wi-Fi to transmit data to the server, where the data is processed and stored. Then, after a given period, new clusters are formed at two levels and new masters and super masters are selected. The order of the list will be refreshed periodically and the two-level clustering hierarchy will be periodically reconstructed. This procedure guarantees fair load distribution among multiple devices, attains maximum throughput and lifetime of the network, and avoids draining the batteries of a few super master devices.

The Bluetooth technology provides two types of data transmissions between devices in a piconet: synchronous connection oriented (SCO) and asynchronous connection less (ACL), both with a data rate of 1 Mbps and transmitting power of 1 mW. The channel is divided into 625 μs time slots, and a new hop frequency is used for each slot, where all of the devices connected to a piconet use a same frequency-hopping schedule controlled by the master. SCO link is established between the master and a single cluster member as a point to point connection with reserved slots. The master reserves time slots to ensure that the capacity is available for an SCO link. Up to a maximum of three SCO links can be maintained by a master at the same time. On the other hand, ACL links can be established between the master and up to seven cluster member devices, using free slots after SCO transmission. ACL can also be used as a point-to-point connection, but the master can broadcast the data to multiple cluster members and the cluster member can only send data when requested to do so by the master. Therefore, two time slots (1250 μs) are needed for each cluster member to transmit its data to the master.

In the described approach, ACL transmissions are used within each piconet to communicate between the master and all the cluster members. It is important to avoid interference from other Bluetooth devices using the industrial, scientific, and medical (ISM) radio band. For that reason, a simple time schedule is used for each device in a second-level Bluetooth cluster. According to this schedule, time is divided between two modes of operation: active mode and sleep mode. The time for each mode is 1250 μs, and each device can send its data only when it is in the active mode.

Figure 2:
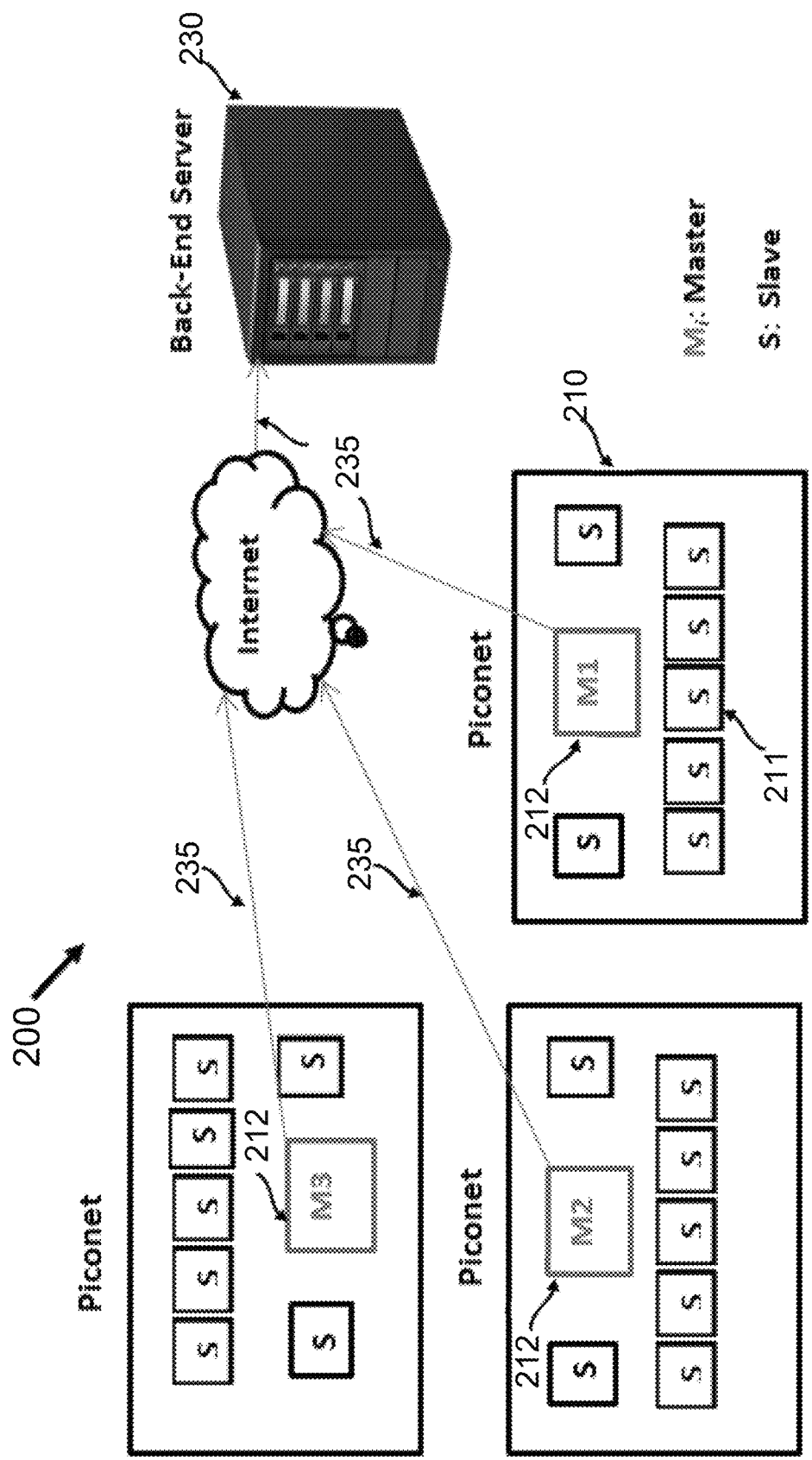
FIG. 2 is an exemplary illustration of concept of one-level clustering network.

FIG. 2 is an exemplary illustration of concept of one-level clustering network. The one-level clustering network 200 here includes just three clusters (piconets) 210 of the first-level, and each cluster involves one master 212 and seven cluster members 211. The three masters 212 communicate with cluster members 211 via Bluetooth as discussed above, while transmits data via Wi-Fi 235 for processing to the back-end server 230. This means a delay time which arises when the master 212 sends data to the back-end server 230 will remain unaffected as the number of clusters increases, in the one-level clustering network 200 illustrated in FIG. 2. This is because the data rate of Wi-Fi (over 10 Mbps) is over ten times larger than that of Bluetooth in charge of internal communication. However, the quality of signal transmissions may decrease as the number of clusters increases due to mutual interference among nearby clusters. When two or more clusters send Bluetooth signals at the same frequency, the signals may collide and become distorted or lost. Communication quality is measured by the frame error rate (FER), which is the proportion of wrong or lost data out of the total data received. Therefore, FER may increase as the number of clusters increases, leading to loss of some data that may be critical, especially for tracking purposes.

Figure 3:
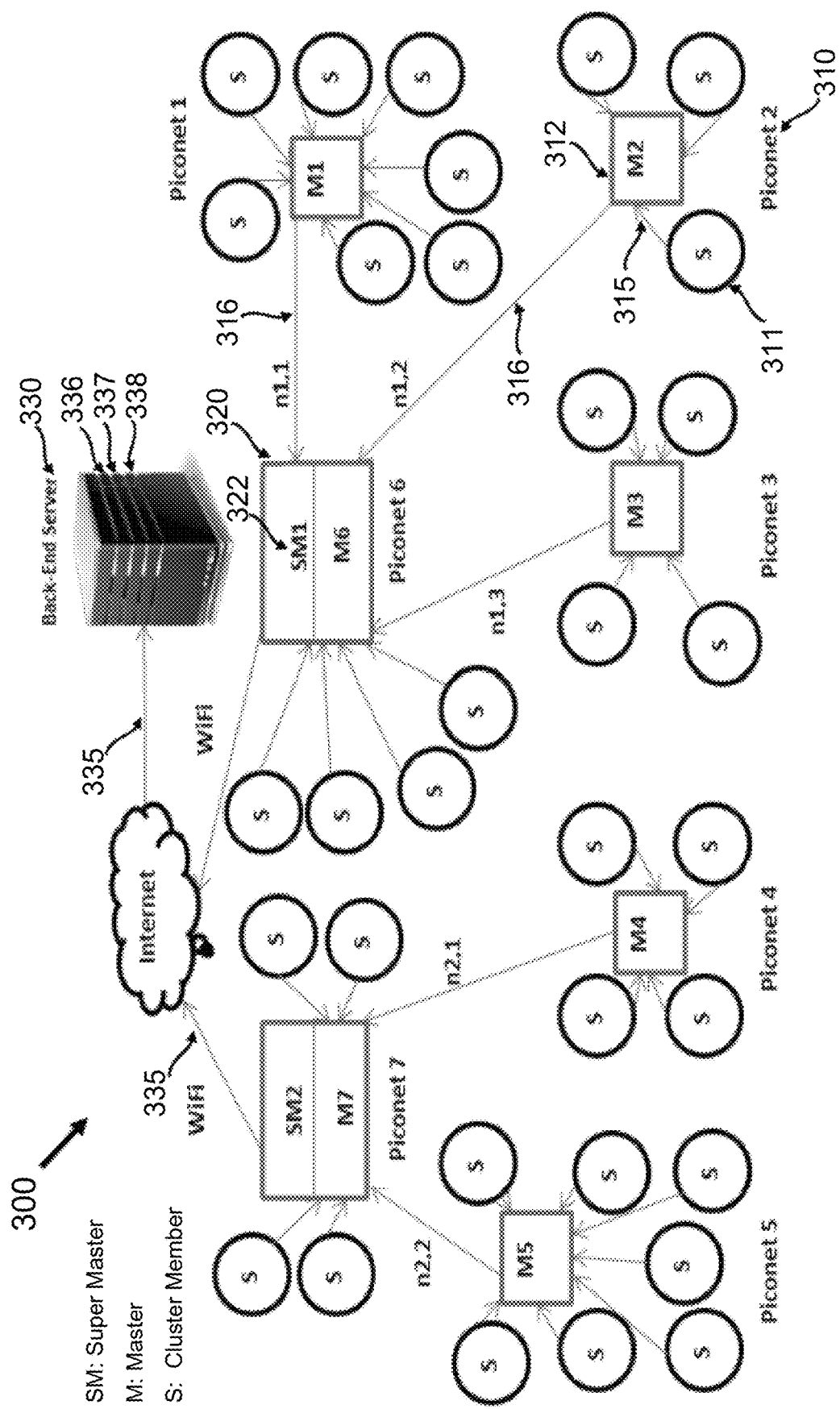
FIG. 3 is an exemplary illustration of wireless network with two-level clustering hierarchy with clusters in the first-level and the cluster in the second-level.

FIG. 3 is an exemplary illustration of a wireless network with two-level clustering hierarchy with clusters in the first-level and the cluster in the second-level. Here, the wireless network 300 includes two clusters in the second-level, piconet 6 and piconet 7, each with the master 6 as the super master 1 (SM1) and the master 7 as the super master 2 (SM2), respectively. The piconet 6 with SM1 includes seven cluster members of the second-level, namely four cluster members of the first-level belonging to the master 6 (M6), and three masters M1 to M3 of the clusters of the first-level, the piconet 1 to piconet 3, as the cluster members of the second-level cluster, namely the piconet 6. The piconet 1 to the piconet 3 each further includes seven, three and four cluster members of the first level, respectively. From data transmission point of view, only the super masters (SM1 and SM2) are configured to transmit data via Wi-Fi for processing to the back-end server. All other internal communications, those within the clusters in the first-level, between cluster members of clusters in the second-level and the super masters, between the cluster member of cluster in the first-level piconet 6 and the super master 1 are performed via Bluetooth. Thus, in the configuration of FIG. 3, the delay time caused at the master of the clusters in the first-level increases as the number of clusters in the first-level increases. This is because a data rate for a communication 316 between a super master 322 and masters 312 is same as one for communication 315 between the masters 312 and the cluster members 311, that is, the data rate of Bluetooth. Adding a second level to the network hierarchy reduces the number of masters that communicate directly with the back-end server, which will reduce mutual interference, and decrease the frame error rate (FER). Therefore, the proposed two-level hierarchical clustering is expected to be more efficient than one-level clustering, especially for highly populated areas.

Here some lemmas regarding the two-level hierarchical clustering are introduced with proofs.

Lemma-I

For the first-level clusters using Bluetooth as a medium among themselves and Wi-Fi as a medium to communicate with a server, the maximum delay will not exceed $D_{max}^1$.

Proof:

Assume N nodes forming M first-level clusters using Bluetooth to communicate among themselves, with M master nodes using Wi-Fi to communicate with a server. Denote $n_i^1$ as the number of nodes in the $i^{th}$ first-level cluster, then $TTS_i^1$ which is the time the $i^{th}$ first-level cluster needs to transmit data to the server can be computed as in Equation (17).

$$TTS_i^1 = n_i^1 T. \quad (17)$$

Here, T denotes the standard Bluetooth cycle duration, i.e. T=1250 μs (Bluetooth SIG, 2017). Once this time passes, the master node can send the collected data including its own data along with its position to the server. Since the size of clusters differs, the maximum delay $D_{max}^1$ that a node may incur is computed as follows.

$$D_{max}^1 = \max\{n_i^1\} T, \ i=1, 2, \ldots, M \quad (18)$$

$$TD^1 \leq D_{max}^1. \quad (19)$$

$D_{max}^1$ is the maximum delay for the first-level clusters in the network hierarchy, which is dominated by the cluster that had the maximum number of nodes among all first-level clusters ($\max\{n_i^1\}$). $TD^1$ is the total delay of all clusters in the first-level of the network hierarchy, which is equal to $D_{max}^1$.

Example-I

For the one-level clustering system illustrated in FIG. 2, there are 3 clusters, each containing 7 members and a master. The maximum number of nodes in each cluster is $\max\{n_i^1\}$ max≤7. Therefore, the total delay of all clusters $TD^1$ is equal to the maximum delay $D_{max}^1 = 7$ T.

Lemma-II

For the second-level clusters using Bluetooth as a medium among themselves and Wi-Fi as a medium to communicate with a server, the maximum delay will not exceed $D_{max}^2 = \max\{TTS_j^2\}$.

This detail can be verified as follows by assuming N nodes forming $M^1$ first-level clusters and $M^2$ first-level clusters using Bluetooth as a medium among themselves, with $M^2$ super master nodes using Wi-Fi as a medium to communicate with a server. Denote $n_{ij}$ as the number of nodes in the $i^{th}$ first-level cluster belonging to the $j^{th}$ second-level cluster, then $TTS_j^2$, which is the time the second-level cluster j needs to transmit data to the server can be computed as in Equation (20).

$$TTS_j^2 = [\Sigma_{i=1}^{M^1}(n_{ij}+1)-1]T, \ j=1, 2, \ldots, M^2 \quad (20)$$

In Equation (20), the constant 1 is added to each $n_{ij}$ to include the data of all first-level master nodes. Since the second-level master (super master) node is also a first-level master, the constant 1 is subtracted from the total delay. Furthermore, each super master node also has to schedule the transmissions of its members. Hence, the total delay ($TD^2$) for transmitting the complete collected data to the server excluding Wi-Fi transmission can be computed as follows.

$$TD^2 \leq \max\{TTS_j^2\} \quad (21)$$

Example-II

For the two-level clustering system shown in FIG. 3, there are 7 first-level clusters and 2 second-level clusters. Therefore:

$$TTS_1^2 = [(7+1)+(3+1)+(4+1)+4]T = 21T$$

$$TTS_2^2 = [(4+1)+(7+1)+4]T = 17T$$

Since every super master node is independent of other super master nodes, each one will send once its data are ready. Hence, the maximum delay for this example is:

$$TD^2 \leq \max\{TTS_1^2, TTS_2^2\} = 21T.$$

Now, performance of the two-level hierarchical clustering approach above presented is evaluated by two methods: one by solving the mathematical programming model Equations (7)-(16) using GAMS and the other by using a MATLAB Simulink simulation model.

The first method, solving the mathematical programming model Equations (7)-(16) was performed under three different scenarios using version 24.3.3 of GAMS (General Algebraic Modeling System). GAMS Specifications. GAMS Software GmbH (2018), https://www.gams.com Retrieved April 2018, the entire contents of which is incorporated herein by reference.

The first scenario tackles the problem by considering only the first two terms in the objective function Equation (7), the terms aim to minimize the number of clusters (masters) and the total distance between masters and cluster members for the clustering in the one-level hierarchy.

The second scenario considers all four terms in the objective function that aims to minimize the number of clusters and the total distance between masters and cluster members for both levels of the hierarchy.

The third scenario considers all four terms of the objective function, and further applies sensitivity analysis by considering two different values for the number of nodes, namely 700 and 800. This is done by changing the second-level cluster size, i.e. the right-hand side of the constraints Equation (12).

All above-described scenarios have been analyzed under the following environment. The size of the service region is set as 10×20 m². The minimum value of the objective function is calculated by GAMS MIP solver, assuming the following different values for the number of nodes: N=100, 200, 300, 400, 500, 600, 700, and 800.

Figure 4:
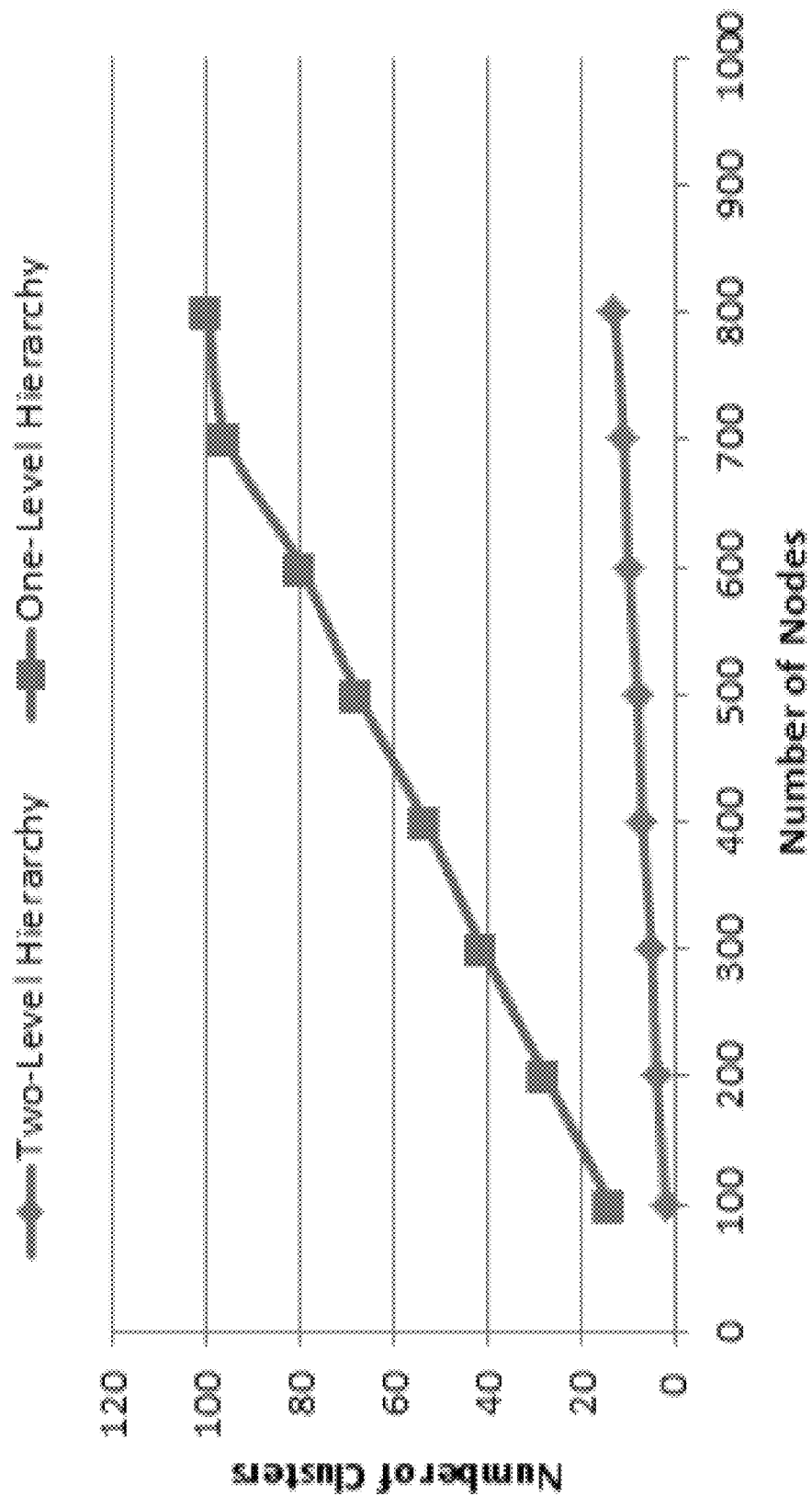
FIG. 4 is an exemplary graph illustrating number of clusters minimizing objective function as a function of various number of nodes.

FIG. 4 is an exemplary graph illustrating number of clusters minimizing the objective function as a function of number of nodes N, results obtained for the first and the second scenarios using GAMS. In case of the first scenario, the closed squares with legend of One-Level Hierarchy indicate the number of masters in one-level clustering. It can be observed that for 100 nodes, only 14 masters are needed. However, for 800 nodes, 100 masters are required. The maximum number of nodes per cluster is 800/100=8, implying up to 7 cluster members per master, which is acceptable for a large-scale system. In case of the second scenario, the closed diamonds with legend of Two-Level Hierarchy indicates the number of clusters (super masters) in the second-level clustering hierarchy. Those results clearly indicate the number of the clusters in the second-level is much smaller than in the first level. For example, for 100 nodes, only 2 clusters (super masters) are required in the second-level of the hierarchy, compared to 14 clusters in the first-level. When there are 800 nodes, only 13 clusters are needed in the second-level compared to 100 clusters in the first-level. Therefore, configuring the super-masters for the second-level to communicate with the back-end server via Wi-Fi leads to significant savings in energy compared to communicating through the first-level masters.

Figure 5:
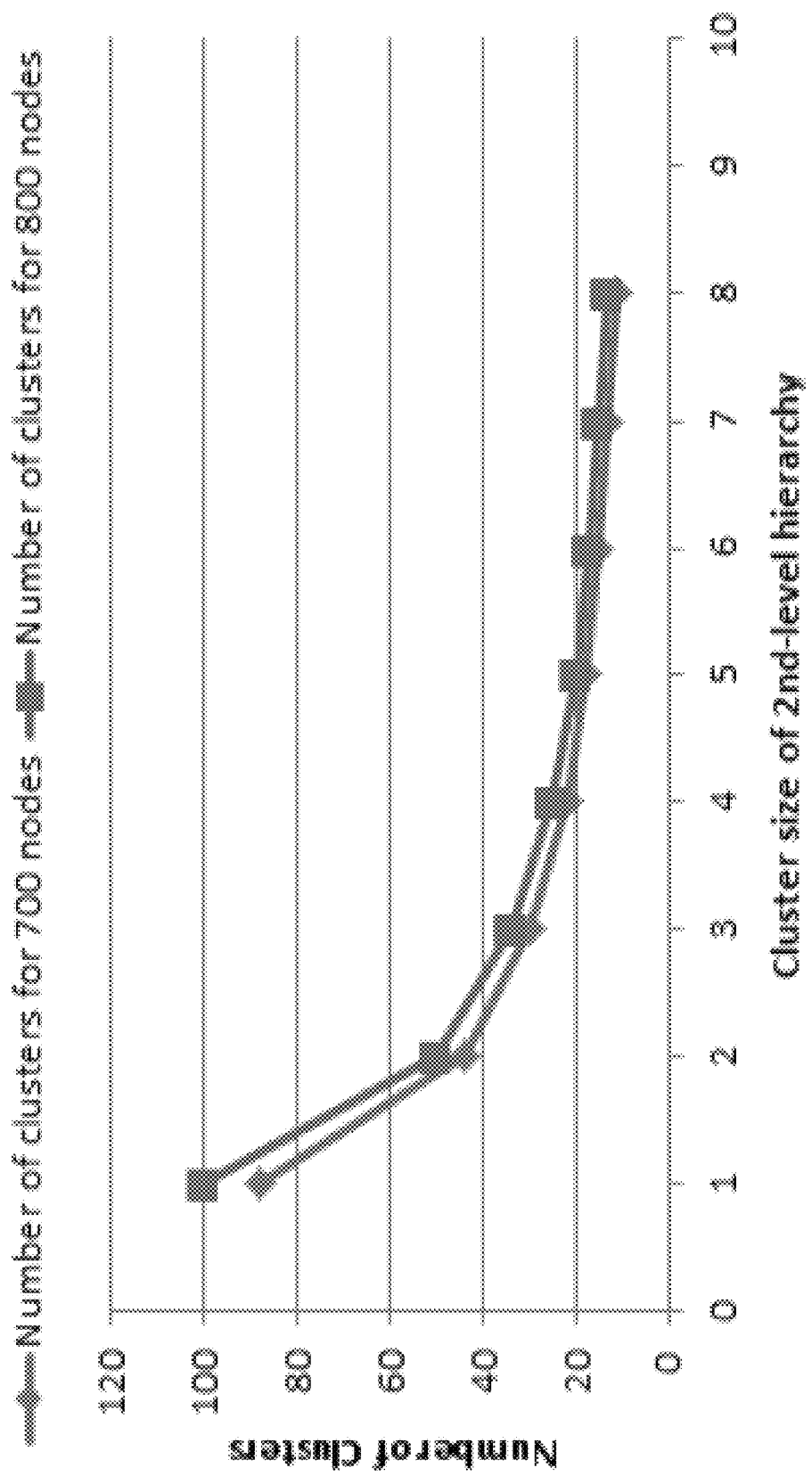
FIG. 5 is an exemplary graph illustrating the number of clusters in the second-level minimizing the objective function for various cluster sizes in the second-level.

FIG. 5 is an exemplary graph illustrating the number of clusters in the second-level minimizing the objective function for various cluster sizes of the second-level, results obtained for the third scenario using GAMS. The results represent a sensitivity analysis in terms of the total number of nodes. Values for the total number of nodes in the system, 700 and 800 are compared. In FIG. 5, the horizontal axis represents the cluster size of the second-level clusters, which is varied from 1 to 8. For 700 nodes, the number of clusters is minimum when the cluster size is equal to 8, corresponding to 11 clusters. For the case of 800 nodes, the number of clusters is also minimum when the cluster size is equal to 8, but it corresponds to 13 clusters. The small number of second-level clusters demonstrate that the two-level hierarchical clustering approach is effective for tracking applications with suppressed power consumption, especially in highly populated areas.

The second method for evaluating the two-level hierarchical clustering approach using the MATLAB Simulink simulation model are presented below with results. The MATLAB Simulink is commonly used to analyze models of radio frequency mechanisms of Bluetooth transceivers. Components of the simulation model include: scatternet, piconet, interference source from 802.11, and modules for measuring important performance parameters of the system. Each transceiver includes a binary data generator, a Gaussian frequency shift keying (GFSK), a pseudo-random number generator to create frequency hopping, and a matching receiver. Golmie N., Van Dyck R. E., Soltanian A., Tonnerre A., and Rebala O., "Interference evaluation of Bluetooth and IEEE 802.11b systems," *Wireless Networks,* 9(3), 201-211, 2003, the entire content of which is herein incorporated by reference. Song M., Shetty S., and Gopalpet D, "Coexistence of IEEE 802.11b and Bluetooth: An integrated performance analysis," *Mobile Networks and Applications,* 12(5), 450-459, 2007, the entire content of which is herein incorporated by reference. Cho D. K., Lee S. H., Chang A., Massey T., Chang C. W., Tsai M. H., and Gerla M, "Opportunistic medical monitoring using Bluetooth P2P networks," *International Symposium on World of Wireless, Mobile and Multimedia Networks* IEEE pp. 1-6, 2008, the entire content of which is herein incorporated by reference. To introduce noise, the 802.11 packet block is generated as an interference source.

Figure 6:
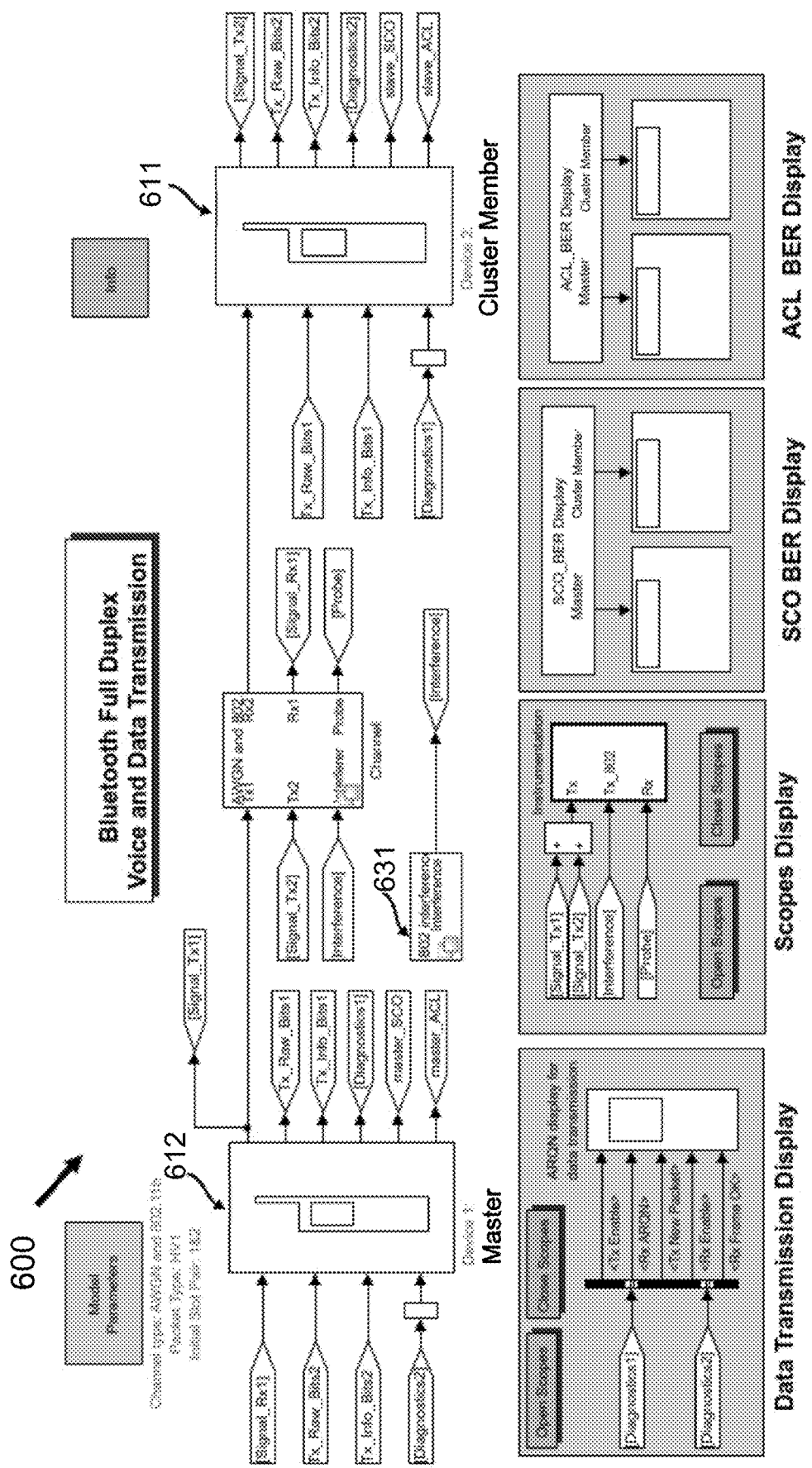
FIG. 6 is an exemplary illustration of Bluetooth full duplex communication simulation model between two Bluetooth devices.

In the simulation, the Bluetooth full duplex transmission model is used, since it is more realistic than the standard Bluetooth model. FIG. 6 is an exemplary illustration of the Bluetooth full duplex communication simulation model 600 between two Bluetooth devices. Here one of the two Bluetooth devices is assigned as the master 612 and the other as the cluster member 611. Both data packets and voice packets can be transmitted between the two devices. The supported voice packet types are: HV1, HV2, HV3 and synchronous connection oriented with repeated transmission (SCORT), where the supported data packet type is DM1. Furthermore, an 802.11b packet block is created as an interference source by a separate independent block 631. Mathew A., Chandrababu N., Elleithy K., and Rizvi S., "IEEE 802.11 & Bluetooth interference: simulation and coexistence," *Seventh Annual Communication Networks and Services Research Conference,* IEEE, pp. 217-223, 2009, the entire content of which is incorporated by reference herein.

Figure 7:
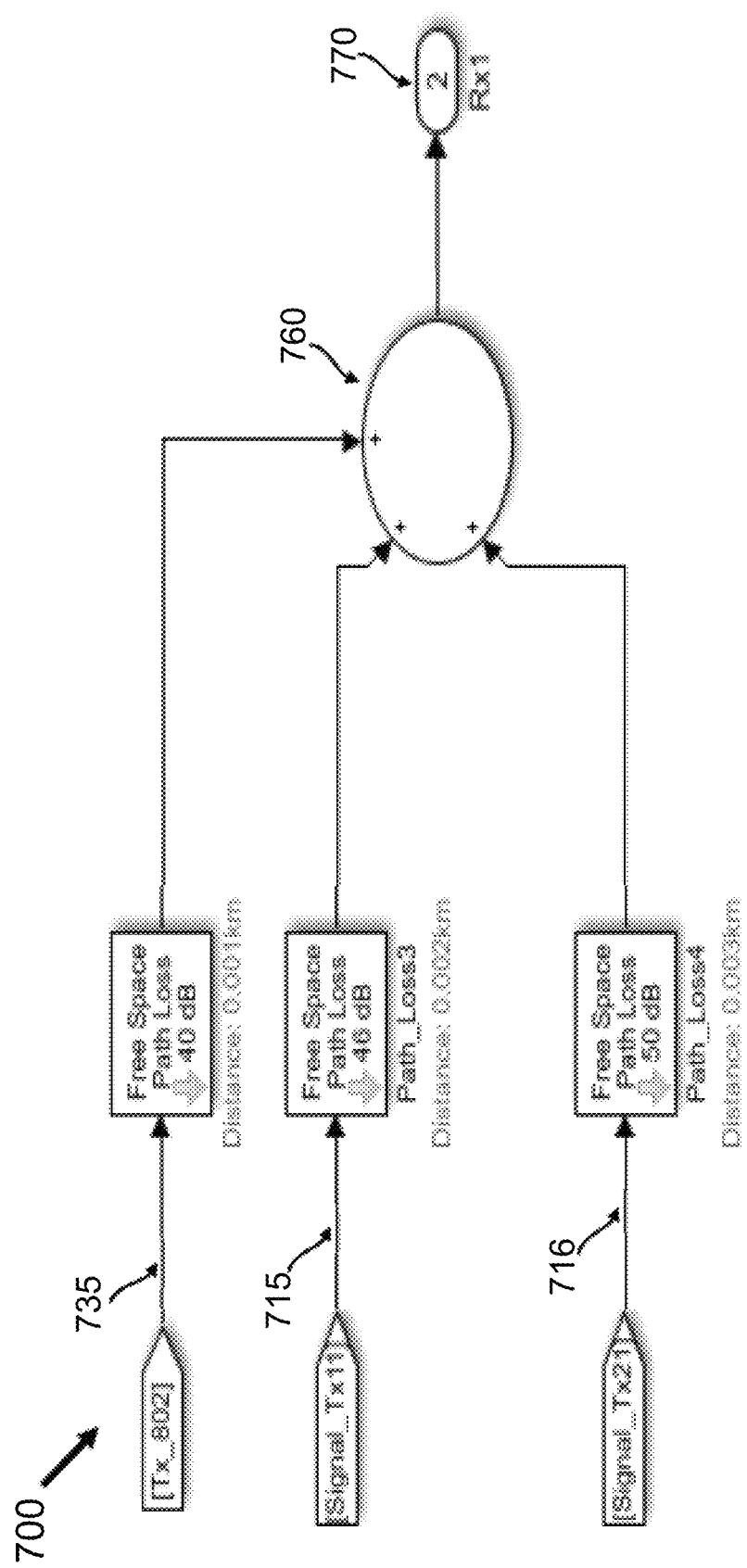
FIG. 7 is an exemplary illustration of new interference model that consists of two clusters existing in the same area.

FIG. 7 is an exemplary illustration of new interference model that consists of two clusters existing in the same area. The signal Tx11 denotes the transmitting power signal 715 to cluster 1 and the signal Tx21 denotes the signal 716 to cluster 2. These two signals are used to find the effect of interference among different Bluetooth signals. In addition, the signal Tx_802 denotes the 802.11b packet block 735 used as an interference source to find the effect of the interference between Bluetooth and Wi-Fi signals. Kamerman A., "Coexistence between Bluetooth and IEEE 802.11 CCK: Solutions to avoid mutual interference," *IEEE P802. 11 Working Group Contribution,* IEEE 802.11-00/162. 2000, the entire content of which is incorporated herein by reference. By adding those transmitting power signals at an adder 760 just before a receiver 770 of each device, it is possible to estimate the effect of interference among different signals. This is done by calculating the free space path loss as a function of the distance to the surrounding signal source from the receiver, which varies randomly from 0.1 m to 10 m.

The simulation model takes into account P—Bluetooth piconets existing together in an area of size 10×10 $m^2$, in order to study Bluetooth piconets (clusters) for highly populated areas. Therefore, each piconet experiences possible interference by (P−1) other piconets. If two or more piconets send out a packet (an information message) on a same frequency band at any time, then the corresponding packets collide and are considered lost. As per Bluetooth standards, all clusters employ the frequency-hopping schedules in which each of the clusters selects a random channel from 79 possible frequency channels. The simulation model is able to capture the interference between different Bluetooth packets and between Bluetooth and Wi-Fi packets when they use the same frequency range. Kamerman A. Id.

It is assumed that each node can send data traffic at a rate of 1 Mbps and it can send frames with sizes up to 20 bytes. For the hardware (Bluetooth/Wi-Fi) energy consumption parameters, the values specified by Yoo and Park (2011) were used. Yoo J. W. and Park K. H. (2011). Id. In order to achieve 95% confidence interval, each simulation was repeated 20 times using different random topologies and then an average was calculated.

Figure 8:
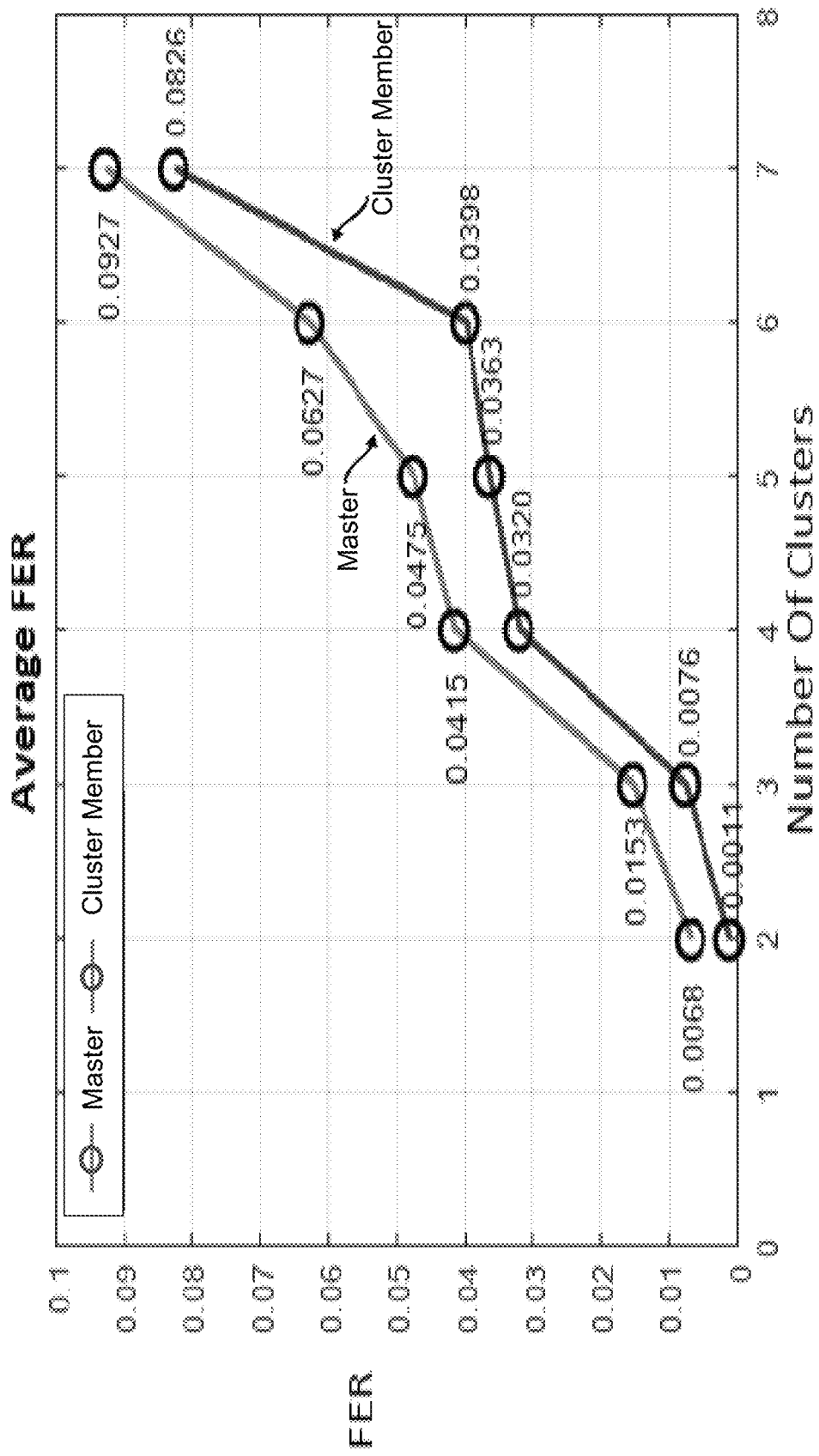
FIG. 8 is an exemplary graph illustrating average frame error rate (FER) as a function of number of clusters P, for one piconet including a master and a cluster member and affected by (P−1) piconets.

FIG. 8 is an exemplary graph illustrating average frame error rate (FER) as a function of number of clusters P, for one piconet including a master and a cluster member and affected by (P−1) piconets. The average FER of the piconet is calculated for each master and cluster member, using the DM1 data packet type. Changing the distance to the surrounding piconets randomly (from 0.1 to 10 meters), the average FER is calculated for 20 runs of the simulation model. In FIG. 8, the average FER of the master is greater than the average FER of the cluster member. It also demonstrates that the average FER increases when the number of the clusters increases and causes higher interference. Therefore, the model is designed to minimize the number of clusters in order to reduce the channel access congestion and hence reduce interference among different signals.

Figure 9:
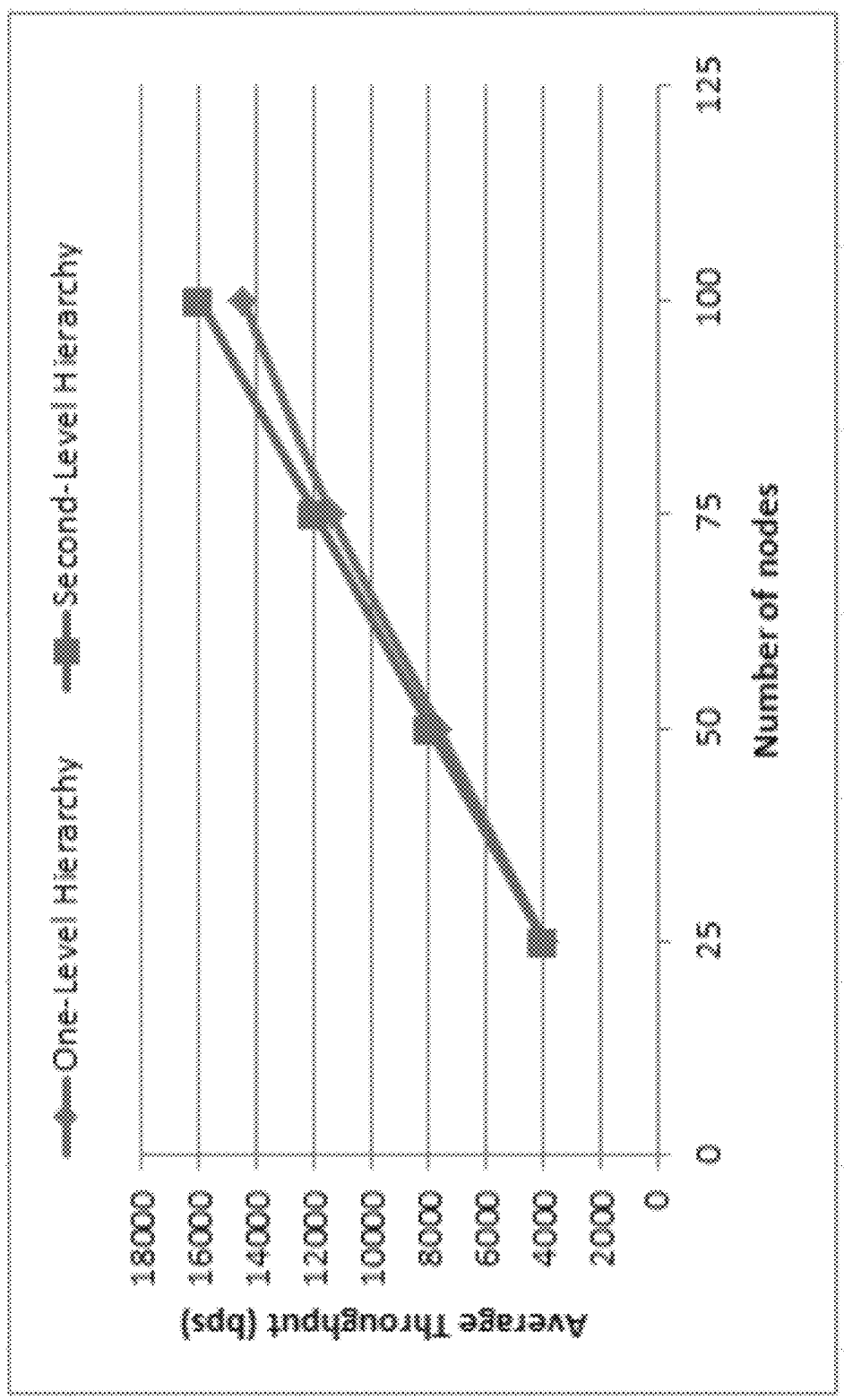
FIG. 9 is an exemplary graph illustrating average throughput of both levels of the clustering hierarchy as a function of the total number of nodes.

FIG. 9 is an exemplary graph illustrating average throughput of both levels of the clustering hierarchy as a function of the total number of nodes. The total energy consumption and throughput were calculated as follows for the number of nodes N:

$$TE = TE_{CH} + TE_{CM} + TE_{idle}, \quad (22)$$

$$G = N \times L \times R(1-FER), \quad (23)$$

$$EF = G/TE, \quad (24)$$

where, TE denotes a total energy consumption of all nodes, $TE_{CH}$, a total energy consumption by cluster heads, $TE_{CM}$, a total energy consumption by cluster members, $TE_{idle}$, a total energy consumption by idle nodes, G, the throughput defined as a total number of successfully received bits, R, the frame rate per second, L, the frame length (size), and EF, the energy efficiency. The frame size was assumed equal to 20 bytes, which is sufficient to send health information messages. FIG. 9 demonstrates that the throughput for the two-level hierarchy is better than the throughput for the one-level hierarchy, especially as the number of nodes increases. This confirms the advantage of using second-level clusters, especially for highly populated areas. The improvements confirmed in FIG. 9 can be proved as a Lemma III as described below.

Lemma III

The effective throughput of two-level hierarchy is higher than single-level hierarchy.

This point can be verified by assuming N nodes forming $M^1$ first-level clusters using Bluetooth as a medium among themselves via masters, among $M^1$ first-level cluster, $M^2$ first-level clusters with $M^2$ super master nodes using Wi-Fi as a medium to communicate with a server. Since each super master node sequentially schedules the transmission slots for its member, no signal collisions will occur. Therefore, the whole set of members belonging to the $j^{th}$ second-level cluster is effectively considered as one piconet in terms of mutual interference (i.e. no interference takes place among these members). Accordingly, the limiting factor in terms of interference is $M^2$ (the number of second-level clusters). Then, the total throughput in this case can be computed as follows. Denoting $G^2(N)$
as a bi-level effective throughput, $$G^2(N) = N \times L \times R \ [1 - FER(M^2)]. \quad (25)$$

On the other hand, for single-level clustering, the key factor is the number of first-level clusters ($M^1$) existing in the same interference range. Therefore, the single-level effective throughput $G^1(N)$ can be computed by:

$$G^1(N) = N \times L \times R \ [1 - FER(M^1)]. \quad (26)$$

But naturally, $$M^1 > M^2,$$

So, $$F(M^1) > FER(M^2).$$

Therefore, $$G^1(N) < G^2(N)$$

Example—III:

For the two-level clustering hierarchy system shown in FIG. 3, let R=1 frame/s, N=35, and L=20 bytes. We can observe from FIG. 3 that $M^1$=7 and $M^2$=2. From FIG. 8, FER (7)=0.0927, while FER (2)=0.0068. Then, $$G^1(K) = 35 \times 20 \times 8 \times (1-0.0927) = 5081 \text{ bits}$$

$$G^1(K) = 35 \times 20 \times 8 \times (1-0.0068) = 5562 \text{ bits}$$

The throughput is enhanced by 10% in the two-level clustering hierarchy system.

Figure 10:
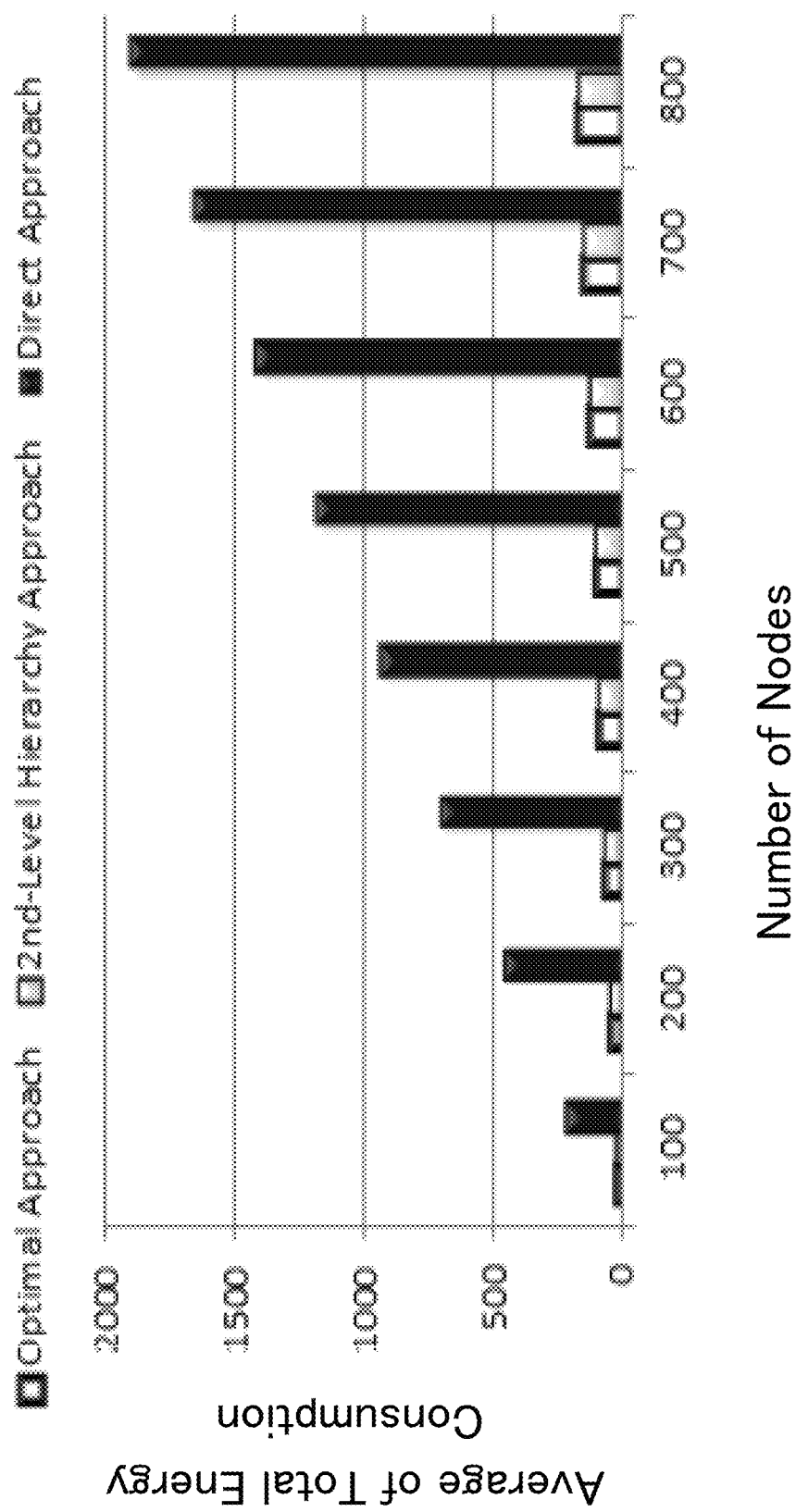
FIG. 10 is an exemplary graph illustrating simulation results on average total energy consumption for various number of nodes.

FIG. 10 is an exemplary graph illustrating simulation results on average total energy consumption for various number of nodes. Here results are compared for three approaches: MATLAB solution on the direct approach without the clustering, MATLAB solution on the heuristic two-level hierarchical clustering algorithm, and GAMS solution on the mathematical programming model under the second scenario including all the four terms of the objective function, Equation (7). Among the three approaches, the GAMS solution on the mathematical programming model is deemed to give a minimum, namely the most exact solution.

Table 3 also lists the total energy consumption for the three approaches. Here in addition to the results for the three approaches illustrated in FIG. 10, the columns "Comparison vs GAMS" list ratios against the GAMS solution on the mathematical model in percent values, for the two-level clustering approach and the direct one-level approach.

TABLE 3

Total energy consumption (Joules) of three approaches

| Number of Nodes | Two-Level Clustering | Direct One-Level | GAMS Mathematical Model | Comparison vs GAMS (%) | |
|---|---|---|---|---|---|
| | | | | Two-Level Clustering | Direct One-Level |
| 100 | 22.9 | 238.41 | 21.8 | 5 | 993.60 |
| 200 | 45.6 | 476.82 | 43.5 | 4.80 | 996.10 |
| 300 | 65.6 | 715.23 | 62.9 | 4.29 | 1037.10 |
| 400 | 87.9 | 953.64 | 84.7 | 3.78 | 1025.90 |
| 500 | 107.3 | 1192.05 | 104.1 | 3.07 | 1045.10 |
| 600 | 128.8 | 1430.46 | 125.8 | 2.38 | 1037.10 |
| 700 | 147.5 | 1668.87 | 145.2 | 1.58 | 1049.40 |
| 800 | 167.9 | 1907.28 | 167 | 0.54 | 1042.10 |

As observed in FIG. 10, the total energy consumption of the two-level hierarchical clustering algorithm is close to the values obtained by the GAMS solution of the mathematical programming model, the minimum total consumption. In fact, the total energy of the two-level hierarchical clustering algorithm becomes closer to the GAMS solution as the number of nodes increases. This is clear in Table 3, which indicates a difference of 5% between the performance of the two-level clustering algorithm and the GAMS solution when the number of nodes is equal to 100, but a difference of only 0.54% when number of nodes is equal to 800. This demonstrates that the two-level hierarchical clustering algorithm proposed is capable of producing high-quality, near-minimum solutions for large-scale tracking problems.

For the direct approach, as observed in Table 3, the energy consumption of the direct approach is 993.6% higher than the GAMS solution when the number of nodes is equal to 100, and 1042.1% higher when the number of nodes is equal to 800. Clearly, the direct approach without clustering is not a practical solution method for large-scale tracking systems.

Figure 11:
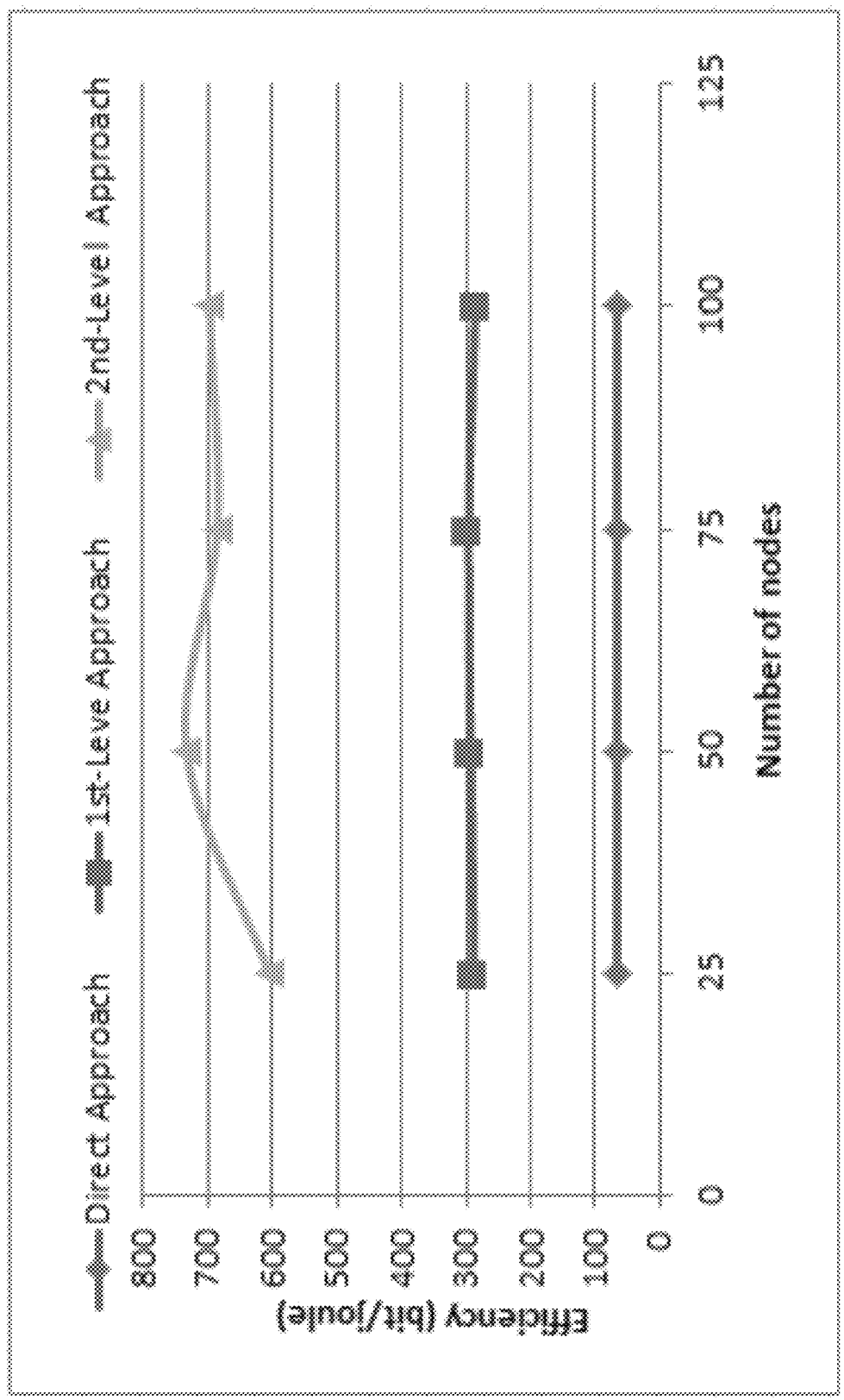
FIG. 11 is an exemplary graph illustrating average efficiency in packet (bit) per Joule for various number of nodes.

FIG. 11 is an exemplary graph illustrating average efficiency in packet per Joule for various number of nodes. Here results are compared for three approaches: the direct approach without the clustering, the one-level clustering approach and the two-level clustering approach algorithm, where the first one is simulated using MATLAB, while the latter two by the GAMS solutions on the mathematical programming model under the first scenario and under the second scenario, respectively. Table 4 lists details of the results illustrated in FIG. 11, including throughput in bps, energy consumption, and efficiency for the three approaches presented.

TABLE 4

Throughput, energy consumption and efficiency for the three approaches in FIG. 11

| Number of Nodes | Throughput of (bps) | | | Energy Consumption of (Joule) | | | Efficiency of (bit/Joule) | | |
|---|---|---|---|---|---|---|---|---|---|
| | Direct | One-Level | Two-Level | Direct | One-Level | Two-Level | Direct | One-Level | Two-Level |
| 25 | 4000 | 3972.8 | 4000 | 59.6 | 13.8 | 6.6 | 67.1 | 287.9 | 606.1 |
| 50 | 8000 | 7668 | 8000 | 119.2 | 26.2 | 10.9 | 67.1 | 292.7 | 733.9 |
| 75 | 12000 | 11430 | 12000 | 178.8 | 38.6 | 17.5 | 67.1 | 296.1 | 685.7 |
| 100 | 16000 | 14516.8 | 16000 | 238.41 | 50.8 | 22.9 | 67.1 | 285.8 | 698.7 |

As observed in FIG. 11, the efficiency packet per Joule of the two-level clustering approach is much better (over twice) than the efficiency packet per Joule of the one-level clustering approach, especially when the number of nodes increases. On the other hand, in the direct approach, the efficiency packet per Joule is about one-tenth of one for the two-level approach and remains constant as the number of nodes increases. The reason is that in the direct approach, each node performs long-range data transmission to the back-end server. Therefore, the probability that each node has to transmit its data to the back-end server is the same regardless of the number of nodes. This is another reason to conclude that the direct approach is not suitable for handling high-data requirements of large-scale tracking systems.

Table 4 indicates further reasons why the above differences arise. In terms of throughput, there is not so much difference among the three approaches: the one-level approach exhibits about ten percent less values than other two approaches or the two-level approach brings just about ten percent of increase compared to the one-level approach in a large number of nodes of a hundred. A dramatic improvement appears in terms of energy consumption: about one fifth reduction by one-level approach from the direct approach, and further about a half reduction by the two-level approach from the one-level approach. These demonstrate that the efficiency reduction in the two-level approach illustrated in FIG. 11 is brought mainly by the dramatic reduction of the energy consumption from the one-level approach as observed in the Table 4.

A method or a system which includes the features in the foregoing description provides numerous advantages. The two-level clustering approach described in the present disclosure have a better performance over other direct approaches without the clustering or the one-level clustering approach. Thus, the present disclosure provides an improvement to the technical field of communication. The two-level clustering approach according to the present disclosure improves not only the energy efficiency but also the total energy consumption from the other two approaches in a large scale-network, for example, for the tracking system with a large number of users of smartphone, where locations and relevant piece of information are reported to the server periodically. In addition, the two-level clustering approach according to the present disclosure has the advantage of improving the throughput compared to the one-level clustering approach.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method comprising:
    registering a node status comprising a series number, a location, a battery level and an availability of a long-range connection to a wireless local area network (WLAN) for each of a set of wireless mobile devices, wherein
        the set of wireless mobile devices is configured to communicate with a back-end server via the long-range connection to the WLAN, and internally via a short-range wireless interface;
    arranging the set of wireless mobile devices into a two-level clustering structure comprising a cluster class selected from the group consisting of a first cluster in a first-level and a second cluster in a second-level, wherein each of the set of wireless mobile devices is assigned one of three positions in the first cluster or the second cluster:
        1) a slave member of the first cluster in the first-level,
        2) a master of the first cluster in the first-level where the master is also the slave member of the second cluster in the second-level, or
        3) a super master of the second cluster in the second-level where the master of the first cluster in the first-level is assigned as the super master and the cluster class in the first-level is assigned as the cluster class in the second-level; and
    updating the two-level clustering structure periodically based on the node status registered most recently, wherein each of the set of wireless mobile devices is reassigned either one of the three positions in clustering in a cluster,
    wherein the super masters are configured to communicate with the back-end server via the long-range connection to the WLAN, and
    a maximum cluster size given by a specification of the short-range wireless interface,
    wherein the arranging includes:
        obtaining a set of solutions minimizing an objective function Z; and
        assigning each of the set of wireless mobile devices one of the three positions in the first cluster or the second cluster based on the set of solutions,
        wherein the objective function Z is defined by below Equation (1) as:

$$Z = \sum_{i=1}^{N}\sum_{j=1}^{N} C_{ij}X_{ij} + \sum_{j=1}^{N} F_j Y_j + \sum_{i=1}^{N}\sum_{j=1}^{N} C_{ij}V_{ij} + \sum_{j=1}^{N} F_j W_j, \quad (7)$$

and
    obtaining the set of solutions minimizing the objective function is carried out by a processor having circuitry with instructions to solve a minimization problem, based on the node status registered and under constraints expressed with below equations (8)-(16), $$\sum_{j=1}^{N} X_{ij} = 1, \ i=1 \ldots N, \quad (8)$$

$$\sum_{i=1}^{N} X_{ij} \leq PY_j, \ j=1 \ldots N, \quad (9)$$

$$\sum_{j=1}^{N} C_{ij} X_{ij} \leq R, \ i=1 \ldots N, \quad (10)$$

$$\sum_{j=1}^{N} V_{ij} \leq Y_i, \ i=1 \ldots N, \quad (11)$$

$$\sum_{i=1}^{N} V_{ij} \leq PW_j, \ j=1 \ldots N, \quad (12)$$

$$\sum_{j=1}^{N} C_{ij} V_{ij} \leq RY_j, \ i=1 \ldots N, \quad (13)$$

$$W_j \leq, \ j=1 \ldots N, \quad (14)$$

$$W_j \leq WF_j, \ j=1 \ldots N, \quad (15)$$

$$W_j \leq BL_j, \ j=1 \ldots N, \quad (16)$$

and with below definitions (1)-(6), $$WF_j = \begin{cases} 1, & \text{if device } j \text{ has the long-range connection to } WLAN \\ 0, & \text{otherwise} \end{cases} \quad (1)$$

$$BL_j = \begin{cases} 1, & \text{if battery level of device } j \text{ is} \geq 50\% \\ 0, & \text{otherwise} \end{cases} \quad (2)$$

$$X_{ij} = \begin{cases} 1, & \text{if device } i \text{ is a slave member belongs to master } j \\ 0, & \text{otherwise} \end{cases} \quad (3)$$

-continued $$Y_j = \begin{cases} 1, & \text{if device } j \text{ is assigned as a master} \\ 0, & \text{otherwise} \end{cases} \quad (4)$$

$$V_{ij} = \quad (5)$$
$$\begin{cases} 1, & \text{if master } i \text{ is a slave member belongs to super master } j \\ 0, & \text{otherwise} \end{cases}$$

$$W_j = \begin{cases} 1, & \text{if master } j \text{ is assigned as a super master} \\ 0, & \text{otherwise} \end{cases} \quad (6)$$

wherein, N denotes a total number of the wireless mobile devices or nodes, $C_{ij}$ denotes a distance between the $i^{th}$ node and the $j^{th}$ node, $WF_j$ denotes availability of the long-range connection to the WLAN for the $j^{th}$ node, $BL_j$ denotes battery level of the $j^{th}$ node, $Y_j$ denotes whether the $j^{th}$ node is assigned as the master, $W_j$ denotes whether the $j^{th}$ node is the super master, $X_{ij}$ denotes whether the $i^{th}$ node is the slave member of the first cluster in the first-level the master of which is the $j^{th}$ node, $V_{ij}$ denotes whether the master i is the slave member of the second cluster in the second-level where the super master of the cluster class is the $j^{th}$ node, $F_j$ denotes a fixed cost of each master and super master and is set equal to 100, P denotes the maximum cluster size including a cluster head, the maximum cluster size given by the specification of the short-range wireless interface, and R denotes a maximum distance range covered by the short-range wireless interface.

* * * * *